United States Patent
Kurtzberg et al.

(10) Patent No.: US 6,473,703 B1
(45) Date of Patent: *Oct. 29, 2002

(54) METHOD FOR CONTROLLING A MANUFACTURING PROCESS UTILIZING CONTROL CHARTS WITH SPECIFIED CONFIDENCE INTERVALS

(75) Inventors: Jerome M. Kurtzberg, Yorktown Heights, NY (US); Menachem Levanoni, Yorktown Heights, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 938 days.

(21) Appl. No.: 08/752,100

(22) Filed: Nov. 20, 1996

(51) Int. Cl.$^7$ ................................................. G06F 19/00
(52) U.S. Cl. ............................ 702/84; 702/81; 700/109
(58) Field of Search .............................. 364/552, 554, 364/551.01, 468.15, 468.16, 468.17, 468.18; 702/81, 82, 83, 84; 700/108, 109, 110, 111

(56) References Cited

U.S. PATENT DOCUMENTS

| | | | |
|---|---|---|---|
| 4,967,381 A | 10/1990 | Lane et al. | 364/551.01 |
| 5,199,439 A | 4/1993 | Zimmerman et al. | 128/670 |
| 5,225,998 A | 7/1993 | Singhal | 364/554 |
| 5,226,118 A | 7/1993 | Baker et al. | 395/357 |
| 5,257,206 A | 10/1993 | Hanson | 364/502 |
| 5,311,759 A | 5/1994 | Mangrulkar et al. | 364/552 |
| 5,392,226 A | 2/1995 | Hamilton | 364/551.01 |
| 5,440,478 A | 8/1995 | Fisher et al. | 364/468.16 |
| 5,442,562 A | 8/1995 | Hopkins et al. | 364/468.15 |
| 5,602,761 A | 2/1997 | Spoerre et al. | 364/554 |

OTHER PUBLICATIONS

Joseph M. Juran, *Quality Control Handbook,* Third Edition (1974), McGraw–Hill Book Company, Chapters 9, 22 and 23, and Table B.

Neter et al., *Applied Statistics,* Third Edition (1988), Simon & Schuster, pp. 279–287, 294–295, 443–451, and Table C.1.

Tom Bassett III, "Control Chart Techniques for High Volume, Multiple Process Wafer Fabrication Areas", 1991 IEEE/SEMI Advanced Semiconductor Manufacturing Conference, pp. 132–142.

Kahraman et al., "Using Triangular Fuzzy Members in the Tests of Control Charts for Unnatural Patterns", Proc. 1995 INRIA/IEEE Symposium on Emerging Technologies and Factory Automation, Oct. 1995, pp. 291–298.

Daniel Billings, "Initializing Control Charts in a Startup Environment With Pre–Control Concepts", Proc. First International Symposium on Uncertainty Modeling and Analysis, Dec. 1990, pp. 177–182.

Martin et al., "Process Performance Monitoring Using Multivariate Statistical Process Control", IEE Proc.–Control Theory Appl., vol. 143, No. 2, Mar. 1996, pp. 132–144.

William Nolte, "SPC with Enable", Proceedings of the IEEE 1994 International Engineering Management Conference, Oct. 1994, pp. 170–176.

Cirulli et al., "A Successful Strategy for Implementing Statistical Process Controls", IEEE/CHMT '89 IEMT Symposium, pp. 96–98.

*Primary Examiner*—Eric B. Stamber
(74) *Attorney, Agent, or Firm*—Scully, Scott, Murphy & Presser; Stephen C. Kaufman

(57) ABSTRACT

The invention discloses methodology for qualitatively extending and exploiting the utility of presently known manufacturing control charts. The method introduces a separate control mechanism comprising establishing confidence intervals to already existing control limits. The confidence intervals, in turn, can be used in presently known control charts to take into account an otherwise uncertainty in a generation of the control limits themselves, thereby increasing the accuracy and robustness of decisions based on the use of the control charts.

12 Claims, 3 Drawing Sheets

ABC XR CHARTS: RIE PROCESS

ABC XR CHARTS: RIE PROCESS

ABC XR CHARTS: RIE PROCESS

ABC XR CHARTS: RIE PROCESS

METHOD FOR CONTROLLING A MANUFACTURING PROCESS UTILIZING CONTROL CHARTS WITH SPECIFIED CONFIDENCE INTERVALS

BACKGROUND OF THE INVENTION

This invention relates to a novel method for controlling a manufacturing process utilizing control charts.

INTRODUCTION TO THE INVENTION

Control charts are a well-known and important means for monitoring the state of a manufacturing process. An example of typical control charts is shown in FIGS. 1A, 1B (numerals 10,12).

In particular, FIG. 1A shows an $\bar{x}$ control chart 10 comprising an ordinate time series of a manufacturing variable (sample number) and an abscissa control limit window (upper control limit UCL and lower control limit LCL). The FIG. 1A control chart 10 provides data in response to an inquiry: Is the manufacturing process centered?

FIG. 1B shows an R-control chart 12 comprising an ordinate time series of a manufacturing variable (sample number) and an abscissa control limit window, and is complimentary to the FIG. 1A control chart 10 in that the control chart 12 provides data in response to the variability of the manufacturing process.

SUMMARY OF THE INVENTION

Our work centers on a critique of the capabilities of extant control charts, of the type illustratively shown in FIG. 1, to an end of disclosing novel methodology which can qualitatively extend and exploit their utility.

To this end, we note that present control charts have inherent problems or deficiencies, including:

1) A fraction of good manufactured products are incorrectly rejected due to false alarms which are inherent in the statistical nature of present control charts.
2) A fraction of unacceptable (bad) products are incorrectly accepted due to false alarms, etc.
3) Decisions for acceptance/rejection are binary, and therefore cannot incorporate an operatives prior knowledge and domain expertise or desired credence level.

As just alluded to, we have now discovered a novel method that can preserve the advantages and features of extant control charts, while it extends and more fully exploits their utility and potential capability.

The novel method comprises the steps of:

(1) constructing a control chart comprising a time series of a manufacturing variable of interest operated upon by process control limits;
(2) computing specified confidence intervals for the control limits; and
(3) generating a signal based on a comparison of a time series measurement of the manufacturing variable of interest with the specified confidence intervals computed for the control limits.

The invention, as defined, can realize significant advantages. For example, and with reference to problems and deficiencies of extant control charts of the type noted above—it can minimize the fraction of good manufacturing product falsely rejected; it can minimize the fraction of bad product which would otherwise be incorrectly accepted; and, it can enable users to utilize prior knowledge i.e., binary decisions are enriched. Other advantages are disclosed below.

BRIEF DESCRIPTION OF THE DRAWING

The invention is illustrated in the accompanying drawing, in which.

DETAILED DESCRIPTION OF THE INVENTION

The detailed description of the invention proceeds by developing, in turn, each of the three steps subsumed by the summarized invention (above).

These steps are typically performed by a computer:

Step 1: Constructing a control chart comprising a time series of a manufacturing variable of interest operated upon by process control limits.

Figure 1A:
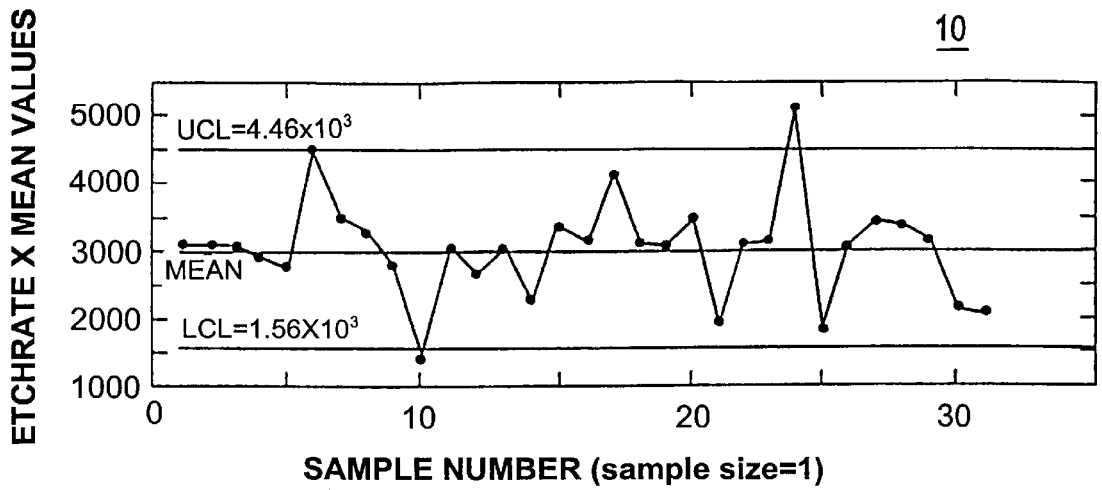
FIGS. 1A, 1B show illustrative prior art control charts.
Figure 1B:
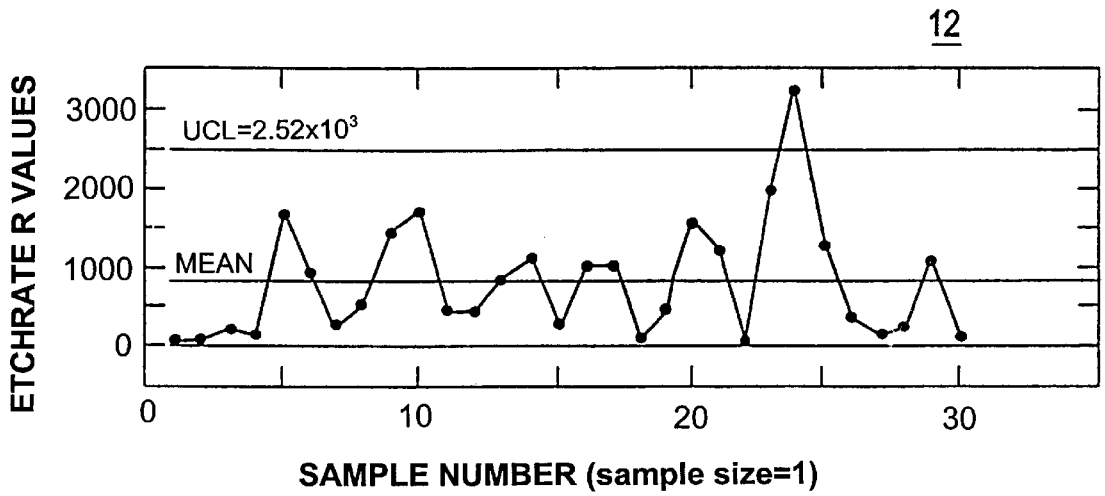

Step 1 comprises constructing or generating, in a conventional manner, a control chart of the type illustrated in FIGS. 1A, 1B. This type of control chart is known in the literature as a normal Shewart or CuSum control chart, with target and upper and lower control limits. See, for example, J. M. Juran "Quality Control Handbook", McGraw Hill, 1988, or Acheson J. Duncan "Quality Control and Industrial Statistics", Irwin Inc. 1986, which materials are incorporated by reference herein.

Step 2: Computing specified confidence intervals for the control limits.

With regard to step 2, we note preliminary that conventional control limits are computed from available data. As new data is collected, the control limits are modified to reflect the new information. Consequently, the control limits themselves are random variables subject to statistical fluctuations.

Now, in accordance with step 2, computing specified confidence intervals for the control limit preferably comprises the following steps:

(i) computing the mean and variance of all the previous values of the control limit; and
(ii) using these two parameters (means, variance) in a normal (Gaussian) distribution to compute confidence intervals at a desired (user selected) level. This can be done analytically or by looking up statistical tables for normal distributions, available in most statistical textbooks. For example, for a normal distribution of mean 5 and variance of 1, the two-tail 90% confidence intervals volumes are: 4.52 and 5.48.

Step 3: Generating a signal based on a comparison of a time series measurement of the manufacturing variable of interest with the specified confidence intervals computed for the control limits.

Step 3 preferably comprises the following included steps:

(i) creating a conventional control chart with conventional limits;
(ii) requesting a confidence level from the user (say 90%);
(iii) computing the appropriate confidence interval for each control limit;
(iv) plotting the confidence intervals around the existing confidence limit;

(v) comparing the latest data value with the upper/lower confidence intervals for each control limit (upper interval for the upper control limit, lower interval for the lower control limit);

(vi) if outside these intervals, generating the alarm;

(vii) otherwise, doing nothing; the process is in control with the desired confidence level.

With new data, update both the control limits and confidence intervals using the old and the new data.

A different implementation would create a conventional control chart with conventional control limits and several bands of confidence intervals (at prescribed level, say 90%, 95%, 99%). The user then compares the data values with his/her desired confidence interval and generates an alarm based on the selected confidence intervals.

Figure 2:
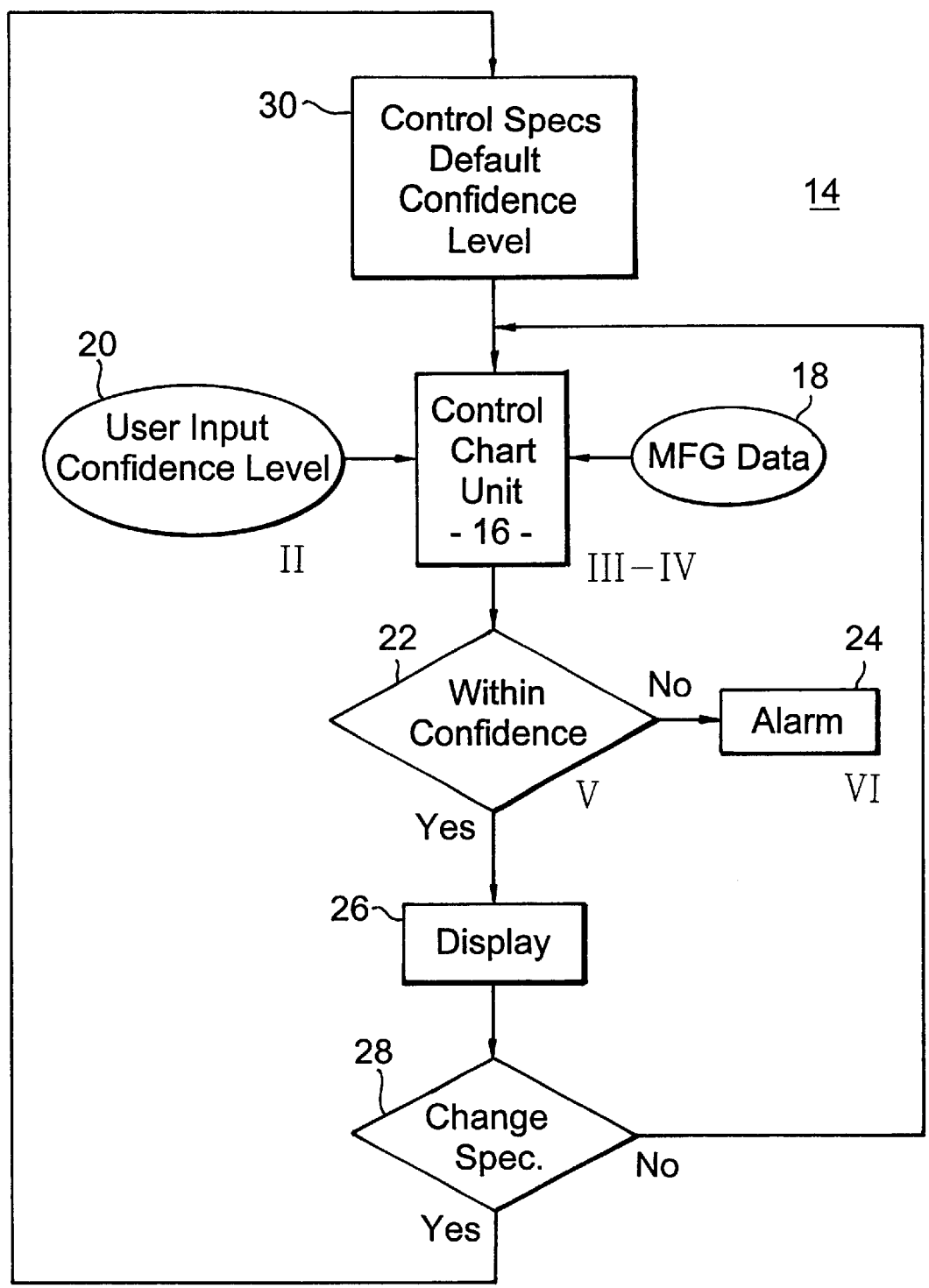
FIG. 2 shows a manufacturing assembly that may be used for realization of the present invention.

Attention is now directed to FIG. 2, which shows a manufacturing assembly 14 that may be used for realization of the present invention.

In particular, the assembly 14 comprises a closed feedback loop. A forward path includes a control chart unit 16, which can input manufacturing data 18 and user input confidence level data 20. The control chart unit 16, in turn, inputs to a "within confidence" decision box 22, wherein a "no" decision triggers an alarm 24, while a "yes" decision triggers a display 26 and "change specification" decision unit 28. The feedback loop closes at this point, with a change specification decision unit 28 "yes" inputting to a control specification—default confidence unit 30; and, with a change specification decision unit 28 "no" inputting to the control chart unit 16.

Figure 3A:
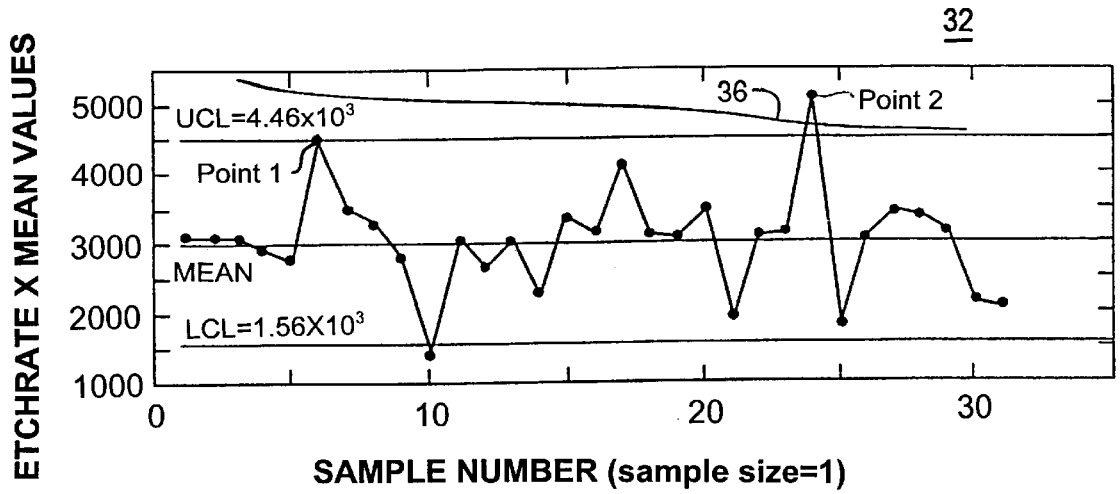
FIGS. 3A, 3B show illustrative control charts in accordance with attributes of the present invention.
Figure 3B:
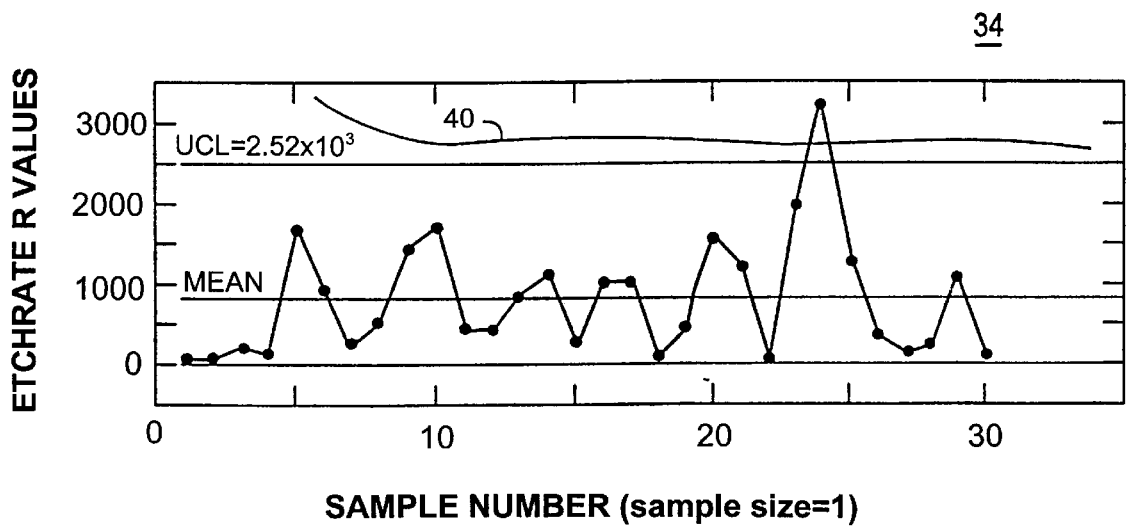

In conjunction with the FIG. 2 assembly 14, we turn to FIGS. 3A, 3B which show control charts 32, 34, modified and in accordance with the methodology of the present invention. In particular (comparison to FIGS. 1A, 1B is instructive), the control charts 32, 34 include, respectively, lines 36, 40 which establish asymptote confidence limits. Thus, for example, the FIG. 3A point 1, inside the asymptote line 36, does not trigger the alarm (it would trigger it in the conventional art), while the FIG. 3A point 2, outside the asymptote line 36, does (correctly) trigger the alarm.

What is claimed:

1. A computer-implemented method for monitoring state of manufacturing control process, said method comprising the steps of:

constructing a control chart, said control chart comprising: a time series of a variable of interest measurement for said manufacturing control process, and an upper control limit, a lower control limit and a target control limit;

computing an upper confidence interval for said upper control limit and a lower confidence interval for said lower control limit at a confidence level;

comparing latest manufacturing process data values with said computed upper and lower confidence intervals;

generating a warning signal when said data values are outside of said computed upper and lower confidence intervals; and maintaining said confidence level when said data values are within said computed upper and lower confidence intervals.

2. The computer-implemented method of claim 1, wherein the step of computing further comprises the steps of:

computing a mean and variance of all values of said upper control limit and said lower control limit; and computing said upper and lower confidence intervals by using said computed mean and variance in a normal distribution.

3. The computer-implemented method of claim 2, wherein the step of constructing a control chart further comprises plotting said upper and lower confidence intervals.

4. The computer-implemented method of claim 3, further providing a plurality of default confidence level values.

5. The computer-implemented method of claim 4, wherein the step of computing further comprises steps of:

requesting said confidence level from a user; and accepting and using said user provided confidence level and using a default confidence level when said user does not provide said confidence level.

6. The computer-implemented method of claim 4, wherein said compared data values are outside said upper and lower confidence intervals when said compared data values are higher than said upper confidence interval and lower than said lower confidence interval.

7. A computer program device readable by a machine, tangibly embodying a program of instructions executable by a machine to perform method steps for monitoring state of manufacturing control process, said method comprising the steps of:

constructing a control chart, said control chart comprising: a time series of a variable of interest measurement for said manufacturing control process, and an upper control limit, a lower control limit and a target control limit;

computing an upper confidence interval for said upper control limit and a lower confidence interval for said lower control limit at a confidence level;

comparing latest manufacturing process data values with said computed upper and lower confidence intervals;

generating a warning signal when said data values are outside of said computed upper and lower confidence intervals; and maintaining said confidence level when said data values are within said computed upper and lower confidence intervals.

8. The computer program device of claim 7, wherein the step of computing further comprises the steps of:

computing a Mean and variance of all values of said upper control limit and said lower control limit; and computing said upper and lower confidence intervals by using said computed mean and variance in a normal distribution.

9. The computer program device of claim 8, wherein the step of constructing a control chart further comprises plotting said upper and lower confidence intervals.

10. The computer program device of claim 9, further providing a plurality of default confidence level values.

11. The computer program device of claim 10, wherein the step of computing further comprises steps of:

requesting said confidence level from a user; and accepting and using said user provided confidence level and using a default confidence level when said user does not provide said confidence level.

12. The computer program device of claim 10, wherein said compared data values are outside said upper and lower confidence intervals when said compared data values are higher than said upper confidence interval and lower than said lower confidence interval.

* * * * *